United States Patent
Benantar et al.

Patent Number: 6,141,758
Date of Patent: Oct. 31, 2000

[54] METHOD AND SYSTEM FOR MAINTAINING CLIENT SERVER SECURITY ASSOCIATIONS IN A DISTRIBUTED COMPUTING SYSTEM

[75] Inventors: Messaoud Benantar, Austin; Robert Howard High, Jr., Round Rock; Mahesh Kumar Rathi, Austin, all of Tex.

[73] Assignee: International Business Machines Corporation, Armonk, N.Y.

[21] Appl. No.: 08/892,222

[22] Filed: Jul. 14, 1997

[51] Int. Cl.[7] ........................................ H04L 9/00
[52] U.S. Cl. .......................... 713/201; 709/229; 713/172
[58] Field of Search ........................ 395/187.01, 188.01, 395/186, 200.55, 200.57, 200.59, 200.58; 380/23, 25; 364/286.5; 713/172, 176; 705/65, 66, 67

[56] References Cited

U.S. PATENT DOCUMENTS

| | | | |
|---|---|---|---|
| 5,373,559 | 12/1994 | Kaufman et al. | 380/30 |
| 5,481,720 | 1/1996 | Loucks et al. | 395/700 |
| 5,485,519 | 1/1996 | Weiss | 380/23 |
| 5,491,752 | 2/1996 | Kaufman et al. | 380/30 |
| 5,495,533 | 2/1996 | Linehan et al. | 380/21 |
| 5,560,008 | 9/1996 | Johnson et al. | 395/650 |
| 5,642,515 | 6/1997 | Jones et al. | 395/727 |
| 5,708,780 | 1/1998 | Levergood et al. | 395/200.12 |
| 5,825,890 | 10/1998 | Elgamal et al. | 380/49 |
| 5,835,724 | 11/1998 | Smith | 395/200.57 |
| 5,875,296 | 2/1999 | Shi et al. | 713/202 |
| 5,907,621 | 5/1999 | Bachman et al. | 380/25 |
| 5,922,074 | 7/1999 | Richard et al. | 713/200 |
| 5,943,424 | 8/1999 | Berger et al. | 380/25 |
| 6,041,357 | 3/2000 | Kunzelman et al. | 709/228 |
| 6,061,741 | 5/2000 | Murphy, Jr. et al. | 709/248 |

*Primary Examiner*—Robert W. Beausoliel, Jr.
*Assistant Examiner*—Scott T. Baderman
*Attorney, Agent, or Firm*—David A. Mims, Jr.; Felsman, Bradley, Vaden, Gunter & Dillon, LLP

[57] ABSTRACT

A method and system for maintaining a secure association between a client and a server in a distributed computing system by computing a session identifier as a function of a Kerberos-based authentication ticket. The session identifier is independently derived or verified by the client and the server upon a first request by the client to the server, and each subsequent request by the client to the server is tagged with this session identifier to provide a reliable security association.

12 Claims, 4 Drawing Sheets

*Prior Art*

6,141,758

METHOD AND SYSTEM FOR MAINTAINING CLIENT SERVER SECURITY ASSOCIATIONS IN A DISTRIBUTED COMPUTING SYSTEM

FIELD OF THE INVENTION

The present invention relates generally to information handling systems and, more particularly, to a method and system for maintaining a secure association between a client and a server in a distributed computing system.

BACKGROUND OF THE INVENTION

A distributed computing system typically allows for the sharing among locations or facilities information processing functions by a collection of computers and other devices linked together by a communications facility such as a network. Quite often, such distributed computing requires a highly structured environment which allows hardware and software to communicate, share resources, and freely exchange information.

Many large computing systems include resources such as one or more central processing units, main memories, disk and/or tape storage units, and printers. Such a system may also include user terminals or client terminals, such as workstations. In many implementations, each user or client terminal may have its own local resources, such as one or more central processing units, associated main memory, a printer, and a disk or tape storage; or a client or user terminal may request such resources from one or more servers or other workstations.

In the present application, it is understood that workstation includes other user terminals that are not necessarily sold as workstations, such as personal computers.

Different approaches have been used to maintain the security of system resources from unauthorized access. One such approach is the use of security tokens or authentication tickets carried from the client to a server. Such a security token or authentication ticket is used to reliably prove the identity of the client to the server and further establish a way of securing subsequent communications between the two entities, hence establishing a secure association between the client and the server.

Due to the cost of computing the security token, a computation that takes place over the distributed computing network because of the need to intervene and secure a security token from a security server, as well as its size and its relative complexity of computation, a security token is only communicated to the server on the first request. Subsequent to that, the client and the server need to find a reliable way to securely communicate with each other under the security association established by the initial security token sent upon the first request, yet without having to send the initial security token on each subsequent request by the client to the server.

What is needed is a reliable and secure way of identifying a security association between a client and server in a distributed computing system without having to send the initial security token on each subsequent request.

SUMMARY OF THE INVENTION

Accordingly, the present invention is directed to a method for maintaining a secure association between a client and a server in a distributed computing system. The method comprises the steps of issuing a security token to the client; sending, by the client, the security token to the server with a first request by the client to the server; validating, for the server, the security token sent by the client; computing a session identifier as a function of the security token; and tagging each subsequent request by the client to the server with the session identifier.

The present invention is also directed to a computer readable medium for implementing the above described method.

The present invention is also directed to a distributed computing system comprising at least one client, at least one server, and a communications network interconnecting the client and the server. The system further includes means for issuing a security token to the client, means for sending, by the client, the security token to the server with a first request by the client to the server, and means for validating, for the server, the security token sent by the client. The system further includes means for computing a session identifier as a function of the security token and means for tagging each subsequent request by the client to the server with the session identifier.

The primary advantage of the present invention is in avoiding the need to send a security token on each subsequent request by a client to a server in order to maintain the security association between the client and the server.

DETAILED DESCRIPTION OF A PREFERRED EMBODIMENT OF THE INVENTION

Figure 1A:
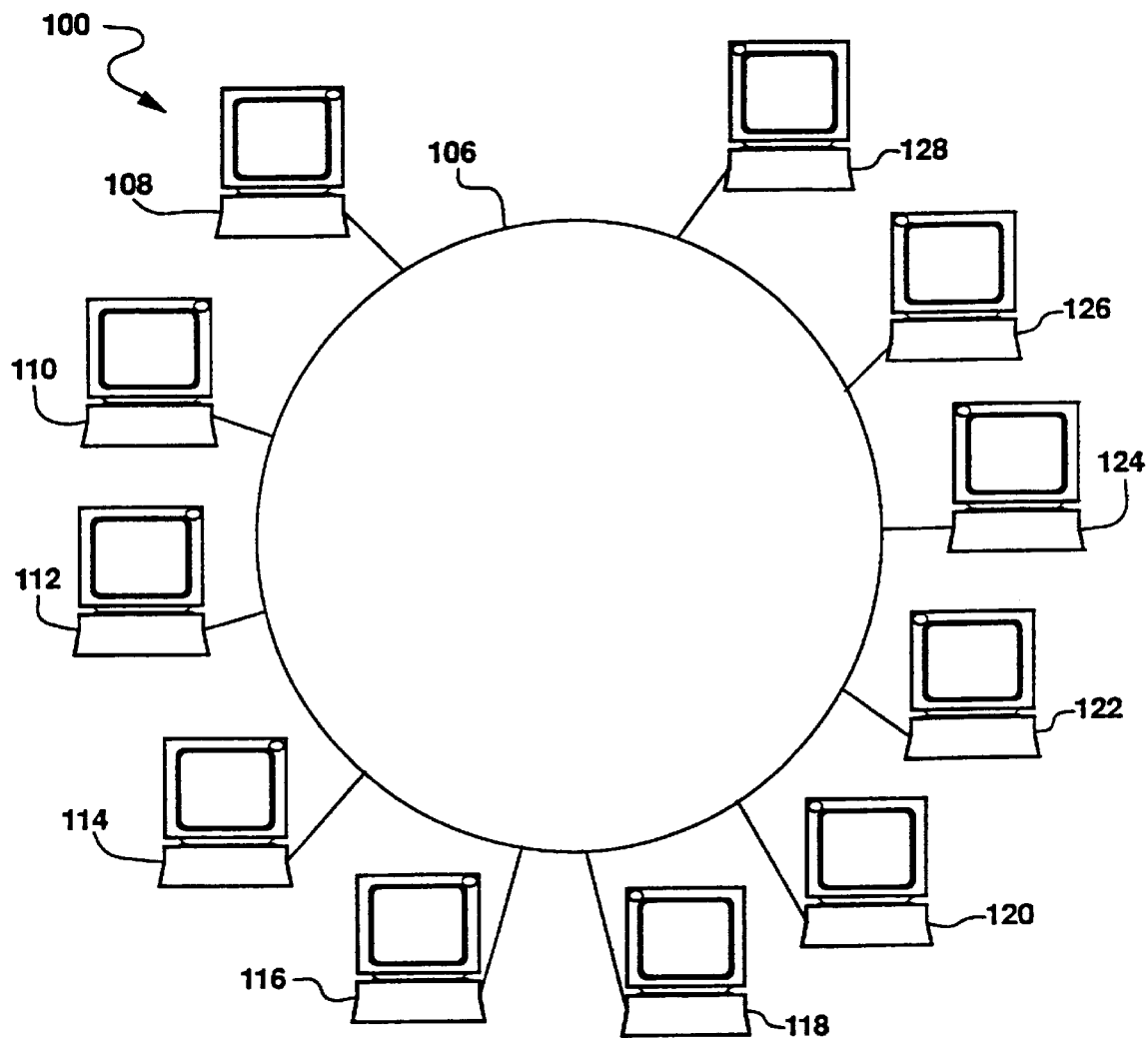
FIG. 1A illustrates a typical distributed computing system for which the present invention is designed.

Referring to FIG. 1A, there is illustrated a distributed computing system 100 having information handling systems 108, 110, 112, 114, 116, 118, 120, 122, 124, 126, and 128 connected thereto in a conventional manner. Each of the information handling systems may be referred to as workstations, clients, or servers. Network 106 may be a local area network, a wide area network, or a nationwide or international data transmission network, or the like, such as the Internet.

Figure 1B:
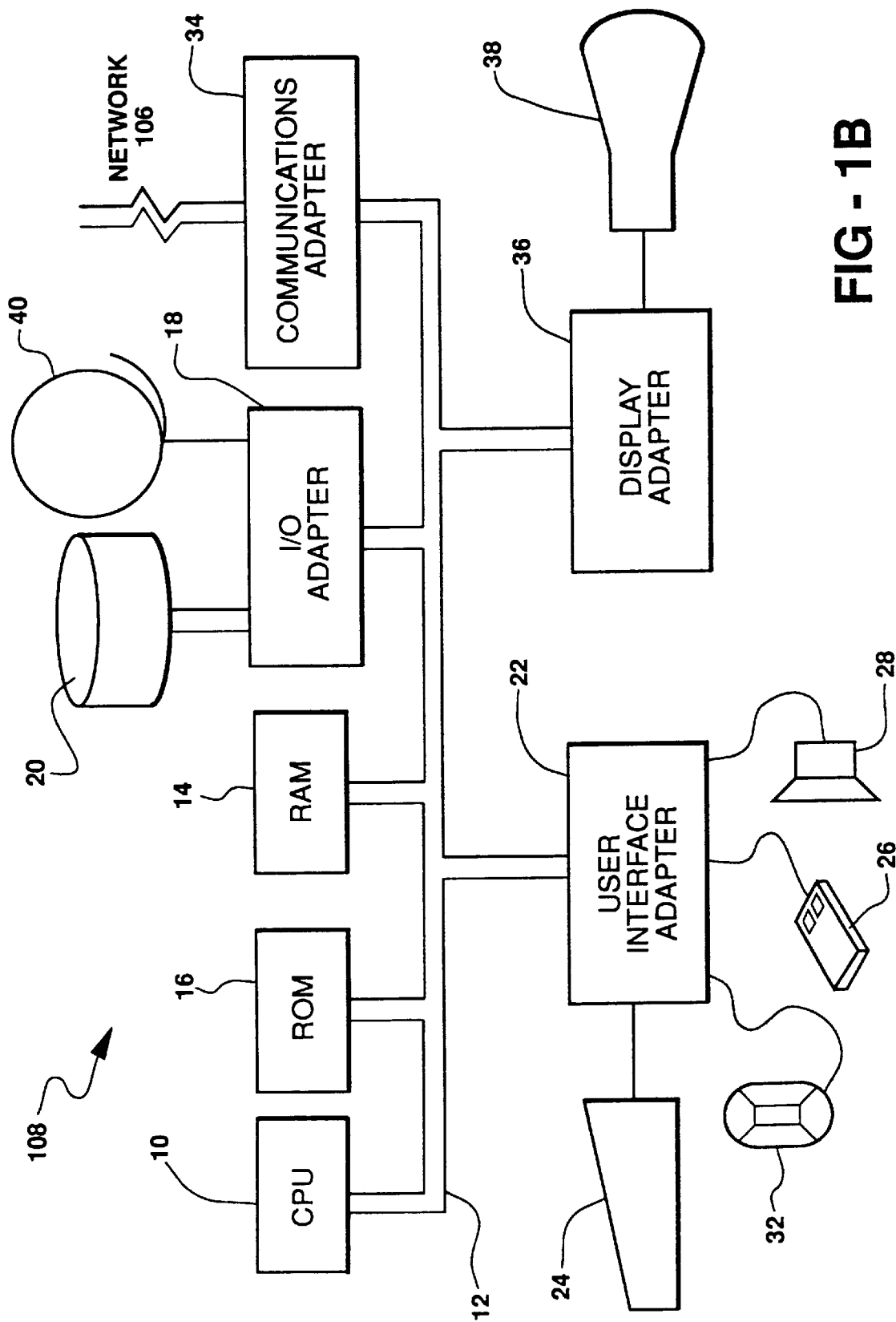
FIG. 1B illustrates an information handling system for implementing the present invention.

Referring next to FIG. 1B, there is illustrated a representative hardware environment which illustrates a typical hardware configuration of an information handling system 108 (see FIG. 1A) in accordance with the subject invention, having a central processing unit 10, such as a conventional microprocessor, and a number of other units interconnected via system bus 12. System 108 shown in FIG. 1B includes random access memory (RAM) 14, read-only memory (ROM) 16, I/O adapter 18 for connecting peripheral devices such as disk units 20 and tape drives 40 to bus 12, user interface adapter 22 for connecting keyboard 24, mouse 26, speaker 28, microphone 32, and/or other user interface devices such as a test screen device (not shown) to bus 12, communications adapter 34 for connecting system 108 to network 106, and display adapter 36 for connecting bus 12 to display device 38.

In the following description, for purposes of explanation, specific program procedures, APIs, and configurations are set forth to provide a thorough understanding of the present invention. The preferred embodiment described herein is implemented by object oriented programming. While it would be apparent to one skilled in the art that the present invention may be practiced without the specific details and be implemented in various computer systems utilizing various operating systems and in various configurations or makes or models of tightly coupled processors or in various configurations of loosely coupled multiprocessor systems. The procedural descriptions and representations which follow are the means used by those skilled in the art to convey the substance of their work to others skilled in the art.

Figure 2:
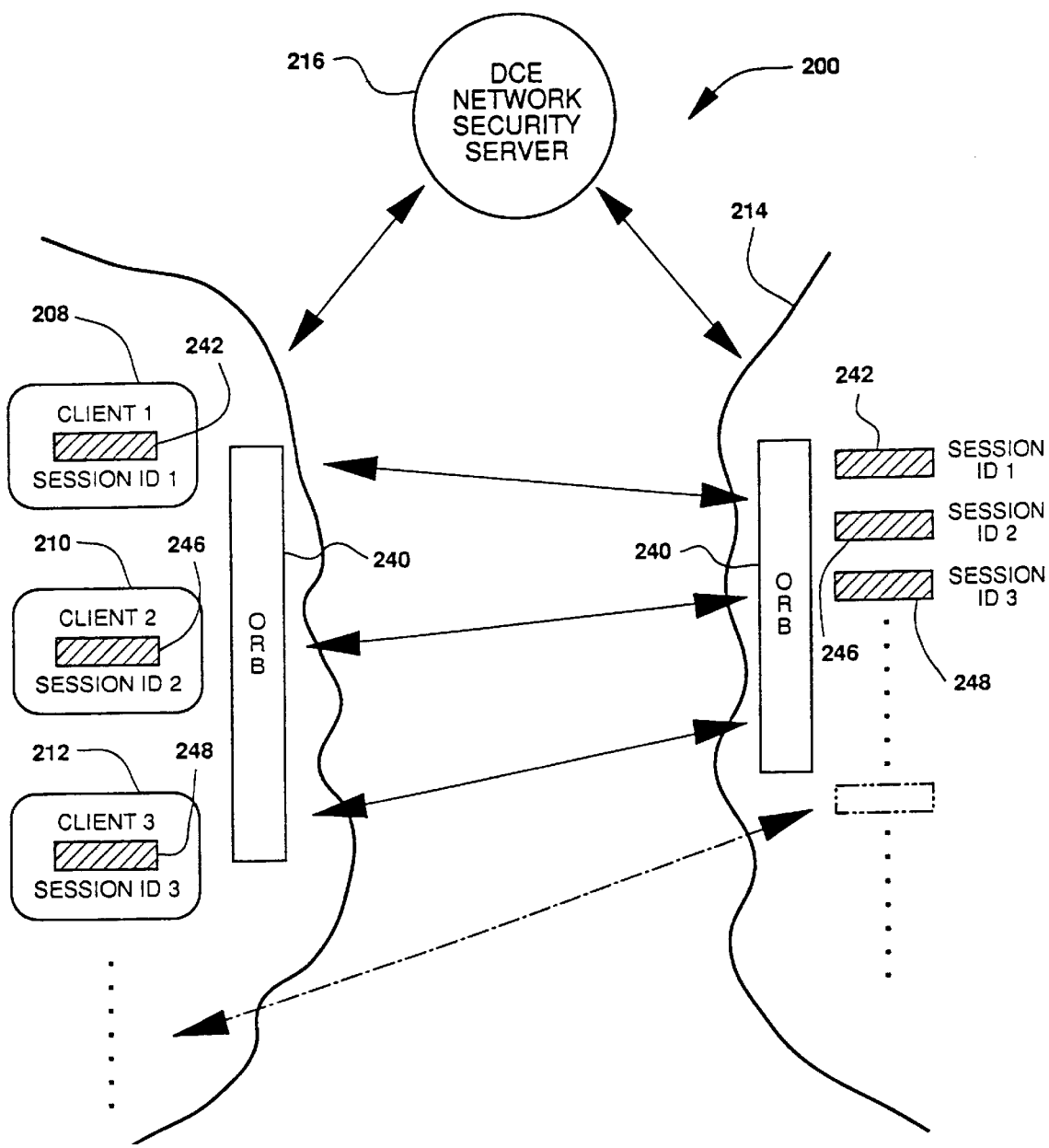
FIG. 2 illustrates a diagram of an exemplary implementation of the present invention.

Referring next to FIG. 2, there is illustrated a diagram of an example implementation of the present invention. Reference numerals used in FIG. 2 which are identical, like, or similar to reference numerals used in FIG. 1A indicate like, similar, or identical components. In this example, there is shown n clients 208, 210, 212, . . . and servers 214, 216 forming a distributed computing system 200 controlled by, for example, object oriented programming. The present invention provides a method and system for maintaining a secure association between clients 208, 210, 212, . . . and server 214. Server 216 is a network security server which provides security functions through the use of an application programming interface such as a generic security service application programming interface (GSS-API).

Clients 208, 210, 212, . . . or server 214 use a common object request broker 240 to manage the security associations between the clients and server. Common object request broker or ORB 240 is used to invoke the GSS-API functions of the network security server 216 to make use of its reliable third party security services. Specifically, on the client side, ORB 240 leads to the client issuing a call to the network security server 216 to acquire a security token or Kerberos-based authentication ticket to be sent to the target object server 214. Upon receipt of the client security token, ORB 240 of server 214 delivers the token to network security server 216 for validation by issuing a corresponding call to network security server 216 to establish a security session between one of the clients 208, 210, 212 and the server 214. The security token is cryptographically unique for each client/server pair, and thus, unique security session identifiers 242, 246, 248, . . . , can be derived from the initial security token for each client 208, 210, 212 That derivation consists of a cryptographic signature of the initial security token. Thus, for each client 208, 210, 212, . . . , there is a unique session identifier 242, 246, 248, . . . , stored in server 214 and sent with each request from a client to server 214. Upon receipt of a request from a client, server 214 determines whether the session identifier matches a session identifier stored in server 214.

Figure 3:
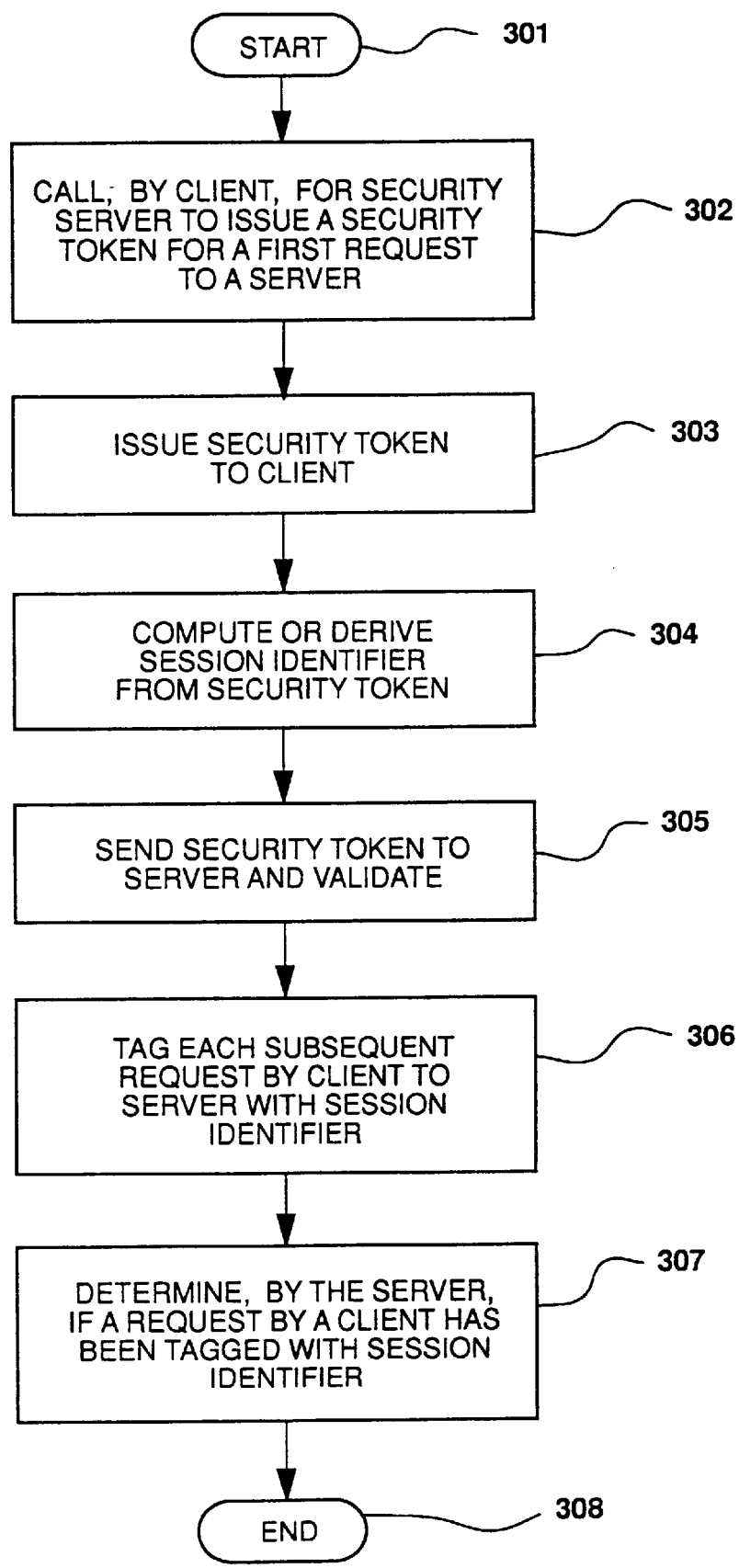
FIG. 3 illustrates a flow diagram illustrating one embodiment of the present invention.

Referring next to FIG. 3, there is illustrated a flow diagram of the aforementioned implementation. At step 301, the process of the present invention begins. In step 302, a client issues a call to the security server 216 to issue a security token upon a first request to a server 214. In step 303, the network security server 216 issues the security token or Kerberos-based authentication ticket to client 208. Next, in step 304, a security session identifier is computed or derived from the security token by cryptographically signing the security token. Next, in step 305, the client communicates the security token to server 214 to establish an initial security association and maintains the session identifier or token signature as an identifier to be used with the server 214. Subsequent requests to the same server are tagged with and identified by this signature or session identifier in step 306. In step 307, a determination is made by server 214 if subsequent client requests are tagged with such signature so as to provide a security association with a legitimate intended client. The process ends in step 308.

It will be appreciated that the session identifier is reliably deduced, derived or decrypted on the client side and its integrity is reliably verified or validated on the server side by cryptographic verification. In other words, the session identifier is independently derived or decrypted or verified from the security token by the client and the server.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 14 of one or more computer systems configured generally as described in FIG. 1B. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for maintaining a secure association between a client and a server in a distributed computing system, said method comprising the steps of:

issuing a security token to the client;

sending, by the client, the security token to the server with a first request by the client to the server;

validating, for the server, the security token sent by the client;

computing a session identifier as a cryptographic signature function of the security token at the client; and tagging each subsequent request by the client to the server with the session identifier such that the session identifier may be cryptographically verified at the server.

2. The method, as set forth in claim 1, further comprising the step of determining, by the server, if a request by the client to the server has been tagged with the session identifier.

3. The method, as recited in claim 1, wherein the security token is a Kerberos-based authentication ticket.

4. The method, as recited in claim 1, wherein the security token is issued and validated by a security server.

5. A distributed computing system comprising:

at least one client;

at least one server;

a communications network interconnecting the client and the server;

means for issuing a security token to the client;

means for sending, by the client, the security token to the server with a first request by the client to the server;

means for validating, for the server, the security token sent by the client;

means for computing a session identifier as a cryptographic signature function of the security token at said at least one client; and means for tagging each subsequent request by the client to the server with the session identifier such that the session identifier may be cryptographically verified at the server.

6. The distributed computing system, as recited in claim 5, further comprising means for determining, by the server, if a request by the client to the server has been tagged with the session identifier.

7. The distributed computing system, as recited in claim 5, wherein the security token is a Kerberos-based authentication ticket.

8. The distributed computing system, as recited in claim 5, wherein the security token is issued and validated by a security server.

9. A computer readable medium comprising means for maintaining a secure association between a client and a server in a distributed computing system, including:

means for issuing a security token to the client;

means for sending, by the client, the security token to the server with a first request by the client to the server;

means for validating, for the server, the security token sent by the client;

means for computing a session identifier as a cryptographic signature function of the security token at the client; and means for tagging each subsequent request by the client to the server with the session identifier such that the session identifier may be cryptographically verified at the server.

10. The computer readable medium, as recited in claim 9, further comprising means for determining, by the server, if a request by the client to the server has been tagged with the session identifier.

11. The computer readable medium, as recited in claim 9, wherein the security token is a Kerberos-based authentication ticket.

12. The computer readable medium, as recited in claim 9, wherein the security token is issued and validated by a security server.

* * * * *